United States Patent [19]

Bolton et al.

[11] Patent Number: 4,663,228
[45] Date of Patent: May 5, 1987

[54] LAMINATED SAFETY GLASS

[75] Inventors: Nelson P. Bolton, Quakertown; W. Novis Smith, Jr., Philadelphia, both of Pa.

[73] Assignee: Advanced Glass Systems Corp., Trumbauersville, Pa.

[21] Appl. No.: 809,847

[22] Filed: Dec. 17, 1985

Related U.S. Application Data

[63] Continuation-in-part of Ser. No. 490,997, May 3, 1983, abandoned.

[51] Int. Cl.⁴ .................. B32B 17/10; B32B 27/30
[52] U.S. Cl. .................................. 428/334; 156/99; 156/106; 156/306.6; 156/331.6; 156/334; 428/411.1; 428/412; 428/441; 428/442; 428/429; 428/426
[58] Field of Search ............ 428/441, 442, 412, 426, 428/429, 334, 411.1; 156/99, 106, 306.6, 331.6, 334

[56] References Cited

U.S. PATENT DOCUMENTS

| | | | |
|---|---|---|---|
| 3,328,367 | 6/1967 | Rees | 525/329.9 |
| 3,344,014 | 9/1967 | Rees | 428/441 |
| 3,404,134 | 10/1968 | Rees | 525/329.9 |
| 3,471,460 | 10/1969 | Rees | 525/329.9 |
| 3,582,455 | 6/1971 | De Lap | 428/442 |
| 3,666,614 | 5/1972 | Snedeker | 428/442 |
| 3,959,539 | 5/1976 | Waggoner | 428/441 |
| 3,998,990 | 12/1976 | Iwami | 428/442 |
| 4,125,669 | 11/1978 | Triebel | 428/412 |
| 4,201,828 | 5/1980 | Triebel | 428/442 |
| 4,204,029 | 5/1980 | Batchelor | 428/442 |
| 4,312,903 | 1/1982 | Molari | 428/442 |
| 4,328,277 | 5/1982 | Molari | 428/412 |
| 4,410,595 | 10/1983 | Matsumoto | 428/412 |

Primary Examiner—Ellis P. Robinson
Attorney, Agent, or Firm—Steele, Gould & Fried

[57] ABSTRACT

Laminated articles, particularly safety glass, comprising a lamina of ionomer resin film laminated to a sheet of glass. The ionomer resin film is preferably an ionically crosslinked ethylene-methacrylic acid copolymer. The laminated articles may also comprise a sheet of polycarbonate laminated to the ionomer resin film opposite the glass. The laminated articles may further comprise an ionomer resin film sandwiched between two sheets of glass. The laminated articles may still further comprise a sheet of polycarbonate or other plastics sandwiched between sheets of ionomer resin film, which are in turn sandwiched between sheets of glass.

40 Claims, 9 Drawing Figures

LAMINATED SAFETY GLASS

This is a continuation-in-part, of application Ser. No. 490,997, filed May 3, 1983 now abandoned.

BACKGROUND OF THE INVENTION

1. Field of the Invention

This invention relates to the field of reinforced glass structures in general, and in particular, to laminated safety glass reinforced with ionomer resin films and/or polycarbonates. Laminates of glass, ionomer resin and metal are also contemplated in the invention.

2. Description of Prior Art

Safety glass can be reinforced by lamination with an inner layer of polycarbonate. The resulting lamination, however, is impractical for two principal reasons. One reason is insufficient bond strength when the polycarbonate is bonded directly to the glass. A second, and even more important reason stems from polycarbonate and glass having different co-efficients of thermal expansion. Safety glass laminates may be bonding polycarbonate directly to glass will crack and craze on cooling from the temperature necessary to bond the two together, due to the different thermal expansion co-efficients of the components.

Initial attempts to solve these problems involved interposing additional interlayers of polyvinyl butyral between the polycarbonate and the glass. Adhesion between the polycarbonate and the glass proved insufficient unless a plasticizer was also used. However, when a plasticizer was used, the plasticizer often caused the polycarbonate to develop stress cracks, and accordingly, to have low light transmission properties.

The initial problems appear to have been solved in the laminated safety glass described in U.S. Pat. No. 3,888,032, which has achieved wide commercial success. The laminate comprises polycarbonate reinforced glass wherein the polycarbonate and glass are bonded to one another by an interlayer of polyurethane. Polyurethane provides sufficient adhesion to glass and to the polycarbonate, and no stress cracking or cloudiness develops in the product.

Despite the commercial success of the polyurethane laminated product, there has been a continuing effort to develop less expensive products, particularly as polyurethane is an expensive component. This invention provides new glass laminates, with and without layers of polycarbonates, and other reinforcing transparent plastics, which are considerably less expensive than the polyurethane laminates, yet which at the same time are every bit as satisfactory, if not more so, with regard to adhesion, strength and clarity. Laminates according to this invention comprise at least one layer of glass laminated with an iomoner resin film.

In the specification and claims the terms "ionomer" or "ionomer resin" mean an extrudable resin comprising ionically crosslinked ethylene-methacrylic acid copolymers; and more particularly, sodium or zinc crosslinked ethylene-methacrylic acid copolymers. Properties which distinguish ionomer resins from other polyolefin heat-seal polymers are high clarity, melt strength, solid-state toughness and resistance to oil/fat permeation. Ionomer resins are generally available as either a sodium or a zinc ionomer, and are available in a wide variety of grades. Amine ionomers are also produced. Although all grades of ionomer resins generally exhibit the properties noted above when compared to other heat-sealed polymers, sodium ionomers are known for exceptional toughness and resistance to fats and oils, while zinc ionomers exhibit outstanding adhesion to unprimed foil and process excellent chemical resistance. Sodium ionomers have proved to provide the best clarity, the zinc ionomers proving hazy at times.

Various grades of ionomer resins are available for extrusion coating and film extrusion. It is also known that ionomer resins can be co-extruded with other plastic resins and exhibit adhesion to other polyolefins, nylon resins and coextrudable adhesive resins often used as bonding layers in multi-ply coextruded structures. A very wide variety of ionomer resins are manufactured by E. I. DuPont de Nemours and Company under the registered trademark "SURLYN".

Ionomer resins have been suggested for use primarily in the area of packaging, for foods, liquids and pharmaceuticals, as well as certain industrial applications including lightweight sails, bonded cable sheath, roof underlayment and flame retardant products. In most applications, ionomer resins ae offered as superior substitute for polyethylene. In none of the literatur or prior art is there any suggestion that ionomer resins should or could be used for reinforcing glass layers or for bonding layers of glass to polycarbonate or other plastic layers, in order to form a laminated safety glass. Moreover, there is no suggesion in the literature or prior art indicating the ionomer resins could or should be substituted generally for polyurethanes.

Layers of ionomer resins can be formed by casting or extrusion, the latter being preferred. One formed there are no significant differences between cast and extruded layers. When the ionomer resin layers are sufficiently thick, polycarbonate layers can be eliminated altogether.

Ionomer resins have several advantages over polyurethane. Polyurethane is difficult to manufacture and hard to fabricate. It is frequently not clear enough for use in windshields and the like. By contrast, ionomer resin films can be easily extruded to desired thicknesses, and at about one-half the material cost of polyurethane. Ionomer resins have demonstrated better adhesion characteristics to polycarbonates, as well as better resistance to lower temperatures. In preferred embodiments, the surface to which the ionomer resin is adhered may be primed to get good adhesion, as is the case with polyurethane. Silane coupling agents are suitable primers. With regard to optical properties, ionomer resins demonstrate better clarity than polyurethane. Moreover, the ionomer resins are more hydrolytically stable to water, acids and bases, are more resistant to degradation from ultraviolet light, and overall, are less likely to weaken with time. This greatly enhances the useful life of laminates made in accord with the present invention.

SUMMARY OF THE INVENTION

It is an object of this invention to provide a laminated article based on laminates of glass and ionomer resins, and depending upon application, laminates of glass, ionomer resin and polycarbonate or other transparent plastics as well. The laminated articles have all of the advantages and positive features of laminates of glass and polyurethane, but are significantly less expensive to produce and have other enhanced features such as increased clarity and greater useful life.

It is another object of this invention to provide a laminated article of glass, ionomer resin and polycarbonate which has good adhesion and which is transparent and resistant to breakage.

It is still another object of this invention to provide a laminated article of glass, ionomer resin and polycarbonate which has good strength properties over a wide temperature range.

These and other objects of this invention are accomplished by articles comprising a lamina of ionomer resin film laminated to a sheet of glass. The ionomer resin film is preferably an ionically crosslinked ethylene-methacrylic acid copolymer. The laminated articles may also comprise a sheet of polycarbonate laminated to the ionomer resin film opposite the glass. The laminated articles may further comprise an ionomer resin film sandwiched between two sheets of glass. The laminated articles may still further comprise a sheet of polycarbonate sandwiched between sheets of ionomer resin film, which are in turn sandwiched between sheets of glass. The laminated articles may still further comprise an ionomer resin film sandwiched between a sheet of glass and a sheet of acrylic plastic and an ionomer resin film sandwiched between a sheet of glass and a sheet of metal. The laminated articles may also comprise any number of lamina of glass sandwiched with a lamina of ionomer resin, the resultant laminate having glass as the outer lamina.

BRIEF DESCRIPTION OF THE DRAWING

The Figures illustrate cross-section views through portions of laminated articles made in accordance with this invention, wherein.

DETAILED DESCRIPTION OF THE PREFERRED EMBODIMENTS

Figure 1:
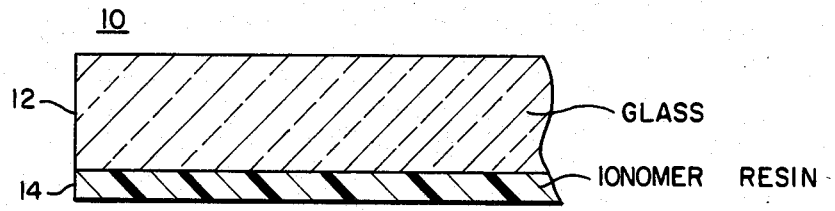
FIG. 1 is a glass/ionomer resin laminate.

The basic laminated safety glass article according to this invention is shown in FIG. 1. The laminate 10 comprises a sheet of glass 12 laminated to an ionomer resin layer 14. The ionomer resin layer 14 is thicker in the basic laminated article than in articles including a layer of polycarbonate or a second layer of glass.

Figure 2:
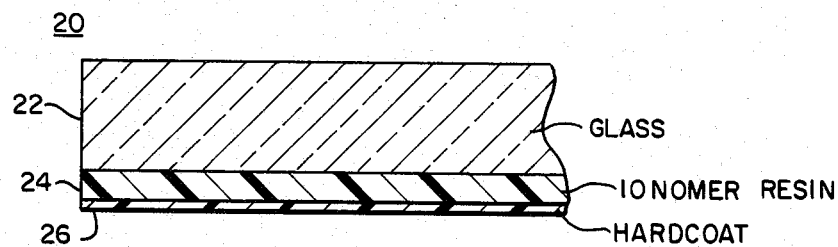
FIG. 2 is a glass/ionomer resin laminate having a hard coat on the otherwise exposed surface of the ionomer resin layer.

A second embodiment of a laminated safety glass article according to this invention is shown in FIG. 2. The laminate 20 comprises a sheet of glass 22 and an ionomer resin layer 24, similar to the laminate 10 of FIG. 1. However, the embodiment of FIG. 2 is further provided with a hard coat 26 on the otherwise exposed surface of the ionomer resin film, in order to protect the ionomer resin film form scratching, abrasion and other similar damage. A "hard coat" provides abrasion resistant, optically transparent coatings which serve to protect the surface and render the laminate more resistant to scratching and the like. Useful "hard coat" compositions are described in U.S. Pat. No. 4,027,073 and U.S. patent application Ser. No. 473,790, filed Mar. 10, 1983, and assigned to the owner of this application.

Figure 3:
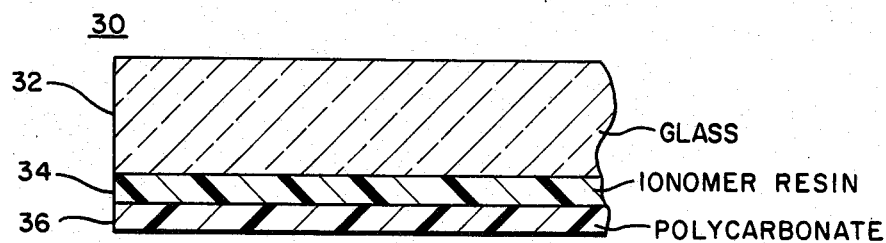
FIG. 3 is a glass/ionomer resin/polycarbonate laminate.

A third embodiment of a laminated safety glass article according to this invention is shown in FIG. 3. The laminate 30 comprises a sheet of glass or a transparent polyester, such as Mylar 32 laminated to an ionomer resin film 34, which is in turn laminated to a polycarbonate, polyurethane or acrylic layer 36. As additional strength is provided by the layer 36, the ionomer resin layer 34 may be thinner than the ionomer resin layer 14 in the embodiment shown in FIG. 1 optionally the Mylar may be provided with a hard coating.

Figure 4:
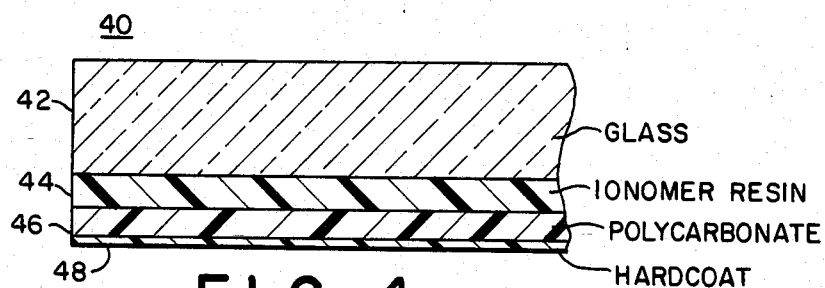
FIG. 4 is a glass/ionomer resin/polycarbonate laminate having a hard coat on the otherwise exposed surface of the polycarbonate layer.

A fourth embodiment of a laminated safety glass article according to this invention is shown in FIG. 4. The laminate 40 is similar to that of FIG. 3, in comprising a glass sheet 42, an ionomer resin layer 44 and a polycarbonate layer 46. Although polycarbonate is used to provide additional strength to the laminate, polycarbonates are usually too soft, and therefore subject to scratches and abrasion. Accordingly, the laminate 40 is provided with a hard coat layer 48 for protecting the otherwise exposed surface of the polycarbonate layer 46.

Figure 5:
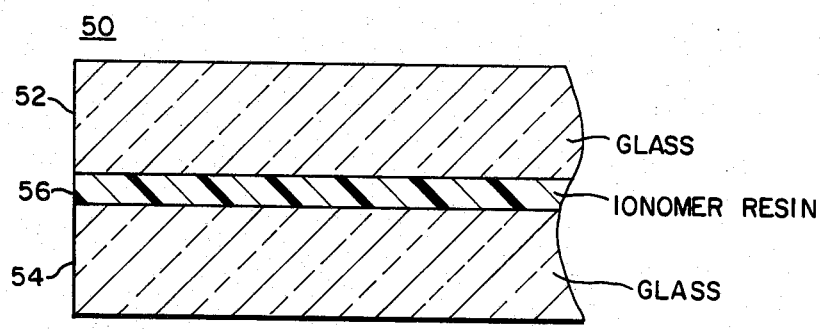
FIG. 5 is a glass/ionomer resin/glass laminate.

A fifth embodiment of a laminated safety glass article according to this invention is shown in FIG. 5. The laminate 50 comprises two sheets of glass 52, 54 joined by an ionomer resin layer 56. As no soft surfaces are exposed, no hard coat layer is necessary.

Figure 6:
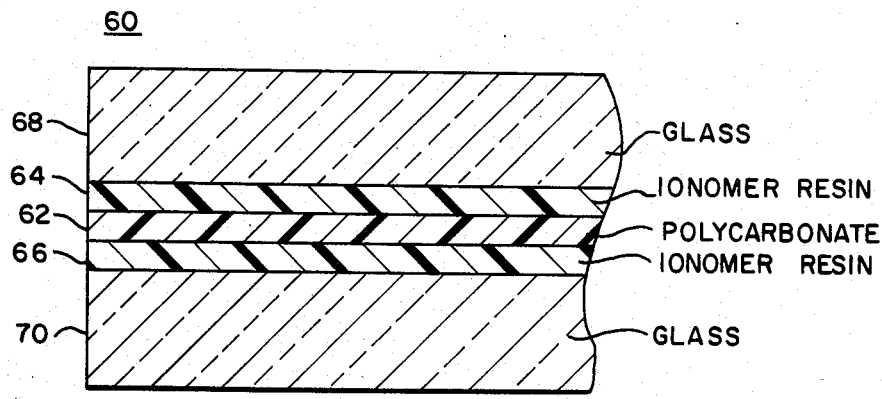
FIG. 6 is a glass/ionomer resin/polycarbonate/ionomer resin/glass laminate.

A sixth embodiment of a laminated safety glass article according to this invention is shown in FIG. 6. The laminate 60 comprises first a polycarbonate layer 62 sandwiched between two ionomer resin layers 64, 66. The ionomer resin/polycarbonate/ionomer resin laminate is itself sandwiched between two glass sheets 68 and 70. As might be expected, the thicker and more complex laminate 60 shown in FIG. 6 is more expensive to produce than the laminates shown in FIGS. 1–5, but it exhibits the greatest strength and resistance to shattering and spalling.

Figure 7:
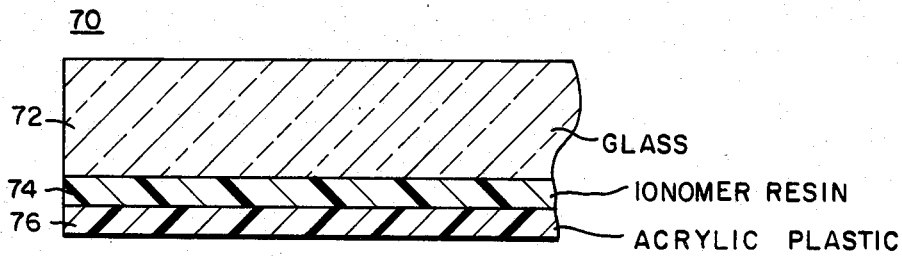
FIG. 7 is a glass/ionomer resin/acrylic plastic laminate.

A seventh embodiment of a laminated safety glass article according to this invention is shown in FIG. 7. The laminate 70 comprises a sheet of glass 72 and a sheet of polyurethane or acrylic plastic 76 joined by an ionomer resin film layer 74. The polyurethane or acrylic plastic layer 76 may or may not be coated with an appropriate hard coat.

Figure 8:
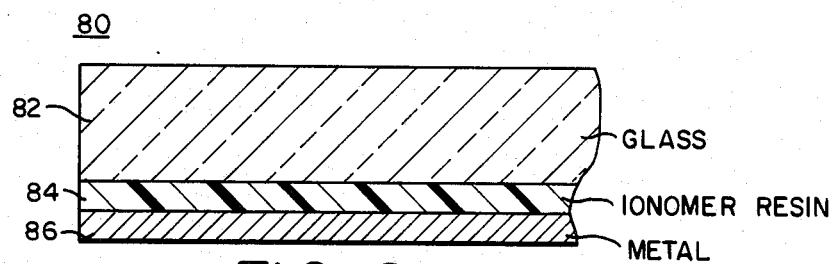
FIG. 8 is a glass/ionomer resin/metal laminate.

An eighth embodiment of a laminated safety glass article according to this invention is shown in FIG. 8. The laminated article 80 comprises a sheet of glass 82 and a sheet of metal 86 joined by an ionomer resin film layer 84. The metal layer 86 may be any metal such as aluminum, silver, iron and copper.

Figure 9:
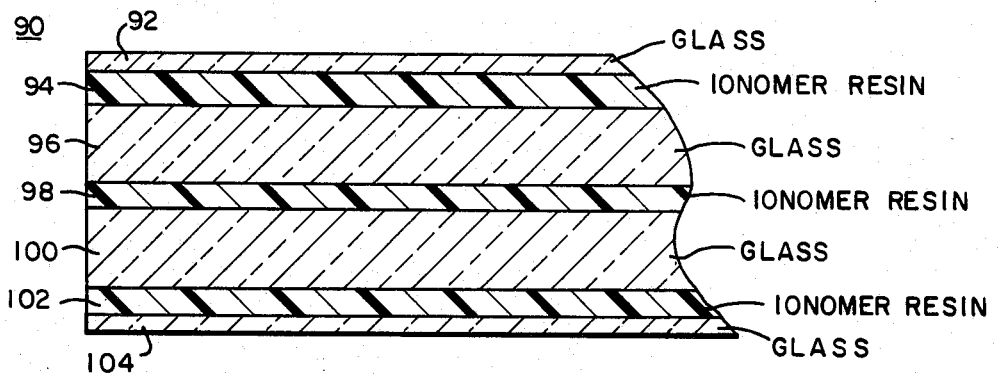
FIG. 9 is a glass/ionomer resin/glass/ionomer resin/glass/ionomer resin/glass laminate.

A ninth embodiment of a laminated safety glass article according to this invention is shown in FIG. 9. The laminated article 90 comprises sheets of glass 92, 96, 100 and 104 sandwiched by ionomer resin film layers 94, 98 and 102.

A number of transparent laminates were prepared for a first series of tests, using a 2.5 millimeter thick sheet of float glass, a ⅛ inch sheet of polycarbonate and a 30 mil thick layer of an ionomer resin film. The ionomer resin film incorporated in the laminate is formulated by melting the ionomer resin pellets, preferably under an inert atmosphere, such as may be provided by nitrogen, at about 380° F., and extruding the molten resin through a die in accordance with procedures well known in the art. Films varying in thickness from 1 mil to 100 mils may be used in the laminates of the invention. The ionomer resin film may be rolled and stored, preferably in a bag or other container to protect it from dust, dirt or other contaminates. The ionomer resin pellets may also be melted and poured into a mold to produce cast sheets of ionomer resin for use in preparing the desired laminates.

The sheets and layers were approximately 4 inches by 5 inches in size to facilitate handling and processing. In particular, the ionomer resin film was "SURLYN" 1601, manufactured by Polymer Products Department of the DuPont Company. The melt index of "SURLYN" 1601 is 1.3 dg/min, ASTM D-1238. The ion type is sodium and the density is 0.94 g/cc. A data information sheet on "SURLYN" 1601 ionomer resin (for flexible packaging) is available under the number E-29173 (7/81). The information of this technical release, including the rheology curves, is incorporated herein by reference. SURLYN type 1707 is also a preferred sodium ionomer resin for use in this invention.

Organic amines may be combined with the ionomer resin in an amount of from about 0.5 to 7%, by weight, based on the weight of the resin. It has been found that the presence of an organic amine in the ionomer resin may serve to maintain the optical clarity of the laminates produced in the invention. The commercially available organic amines are simply combined with the ionomer resin pellets and extruded or cast as desired.

Likewise, a mixture of sodium and zinc ionomer resins may be used to prepare the ionomer resin film useful in the invention. The sodium and zinc ionomer resins may be combined in a ratio of 95:5 to 5:95.

For purposes of simplifying the test, the sandwich was constructed with one outer layer of glass, one inner layer of ionomer resin and one outer layer of polycarbonate. A three layer laminate as tested can be fully expected to perform in the same manner as a five layer lamination such as that shown in the drawing with regard to adhesion, if not overall strength. The sandwiched laminates were assembled in a vacuum bag and placed in an autoclave. The samples were heated to a temperature of from about 200° F. to about 275° F. over a 45 minute period, were held at the elevated temperature for about 15 minutes, and were then cooled to room temperature, approximately 65° F.-70° F. After cooling, the laminates were immersed in boiling water in an effort to promote premature and unwanted delamination. Throughout all of the examples herein, the same basic procedure, involving vacuum bag, autoclave, heating up, sustained heating and cooling were followed unless otherwise noted.

The tests were conducted with and without certain primers to promote adhesion between the ionomer resin and the glass and polycarbonate respectively. Primers suitable for glass, and the glass/ionomer resin interface in particular, were found to include salines, such as those produced under the registered trademarks "Z-6040" and "Z-6020" by Dow Chemical Company. Other primers suitable for the polycarbonate/ionomer resin interface in particular, were found to include organic amines, usually in a diluted solution with an inert solvent (unlikely to attack the polycarbonate, e.g. alkanes and alcohols), such as aliphatic or polyethylene amines or ethanolamines, and specifically diethylenetriamine. Other specific primers include diisocyanates (toluene diisocyanate) and polyacrylic acid (produced under the registered trademarks "ACRYLOID" and "ACRYSOL" by the Rohm and Haas Company).

EXAMPLE 1

A laminate of glass and ionomer, the glass surface to be laminated to the ionomer resin having been primed with Dow Z-6020 was formed following the procedure set forth above. The laminate did not undergo delamination in boiling water.

EXAMPLE 2

A 30 cm by 30 cm laminate comprising a 3 mm thick clear polycarbonate sheet sandwiched between two 0.7 mm thick ionomer resin films made from SURLYN 1601 which in turn are sandwiched between 2.5 mm thick sheets of chemically strengthened glass was prepared following the procedure set forth above. The glass and polycarbonate components were throughly cleaned and treated with a silane primer to enhance adhesion. The components were dried, and free of residual solvents and moisture prior to forming the sandwich. The sandwiched laminate was bagged and autoclaved at a temperature of 205° to 255° F. under 10 atmospheres of pressure for a period of about 90 minutes. The laminate was cooled quickly to room temperature. The laminate was used as a target and a 45 calibre bullet from a handgun was fired at the laminate three times. No delamination occurred although the glass shattered. The ionomer resin film remained laminated to the polycarbonate and glass surfaces.

EXAMPLE 3

Laminates 75 mm square were prepared following the procedure and using like components specified in Example 2 were prepared. The resultant laminates were placed in boiling water. The laminates did not lose integrity after two hours in boiling water. Small bubbles did develop about the perimeter the laminates; however, visibility was only marginally impaired around the perimeter.

On the basis of the foregoing examples, ionomer resin films may be substituted for polyurethane and polyvinyl butyral in laminated safety glass, at a substantial savings in cost. The best primer for the polycarbonate/ionomer resin interface is Dow Z-6020. Other primers could prove satisfactory.

EXAMPLE 4

A 30 cm by 30 cm laminate comprising an 0.25 mm thick ionomer resin film sandwiched between 1 mm thick chemically strengthened glass and a 1 mm thick aluminized steel sheet following the procedure set forth in Example 2. The laminate was cycled between −20° F. to 160° F., 10 times and did not undergo delamination.

EXAMPLE 5

A 30 cm by 30 cm laminate comprising a 3 mm thick clean acrylic sheet sandwiched between two 1.4 mm thick ionomer resin films made from SURLYN 1707 which in turn are sandwiched between 3 mm thick sheets of chemically strengthened glass was prepared following the procedure of Example 2. A long 22 caliber rifle bullet was fired at the resulting laminate from a distance of 35 feet, and no penetration resulted.

EXAMPLE 6

A 30 cm by 30 cm laminate comprising chemically strengthened glass and ionomer resin film made from SURLYN 1707 sandwiched in the order shown in FIG. 9 was prepared following the procedure of Example 2. The lamina was laid up in the following order, starting with the target side: a 2.5 mm thick lamina of chemically strengthened glass, a 5 mm thick lamina of ionomer resin film, or 12 mm thick lamina of chemically strengthened glass, a 5 mm thick lamina of ionomer resin film, a 12 mm thick lamina of chemically strengthened glass, a 5 mm thick lamina of ionomer resin film and a 1 mm thick lamina of chemically strengthened glass. All surfaces were cleaned and treated with a silane primer to enhance adhesion. In this instance, the laminate was autoclaved under vacuum at a temperature between 205° F. and 285° F. at 10 atmosphere pressure for a 2.5 hours. After cooling quickly, the resulting laminate was clear and used as a target with the mass of glass facing in the direction of fire. A 0.357 magnum handgun using 158 grain metal painted ammunition of Remington was fired at the laminate. No penetration occurred after three shots were fired in a triangular pattern. The 1 mm thick glass sheet did splinter but remained laminated.

This example was repeated substituting 6 mm thick cast sheets of ionomer resin for the 5 mm thick ionomer resin lamina and in place of the 1 mm thick glass spall sheet. The resultant laminate was not penetrated when fired on as above, and only a slight bulge appeared on the spall sheet.

An organic diamine was selected from the group of diamines listed below and was mixed with a partially neutralized Surlyn 1707 resin. The mixture was added to the resin port of a small extruder (Wayne Machine Co., 7-in extruder, with a nine inch die). The extruding barrel was maintained at 325°–400° F. A 50 to 60 mil film was extruded and cut into six inch squares stacked to about one-half inch thickness and laminated between two primed one-fourth inch glass plates in an autoclave at 255° F. for three minutes under 150–200 psi pressure in a vacuum. The final ionomer layer was optically clear and one-half inch or more in thickness with a light transmitance over 50%.

The following amines in the weight percents given were combined with Surlyn 1707. For each amine, excellent optical clarity was achieved.

| Amine | Weight Percent |
| --- | --- |
| (a) 1,4-butamediamine | 1 |
| (b) 1,6-hexanediamine | 1 |
| (c) BAC | 1 |
| (d) isophorone diamine | 3 |

Similarly, following the aforementioned procedure, a mixture of zinc ionomer or an ionomer neutralized with both zinc and sodium ions may be utilized in place of the sodium ionomer. The mixture of ions produces an ionomer having greater impact resistance.

The ionomer may be partially neutralized with a metal cation selected from the group consisting of alkali metals, aluminum and zinc. Most preferable are sodium and zinc cation.

Other ionomers which may be utilized in connection with the invention are disclosed in co-pending application Ser. No. 642,042 filed Aug. 17, 1984, which is incorporated herein by reference.

The preferred organic amines which are utilized as the metal cation are selected from the group consisting of 1,3-diaminomethyl xylene, isophorone diamine and a monocyclic compound of the formula:

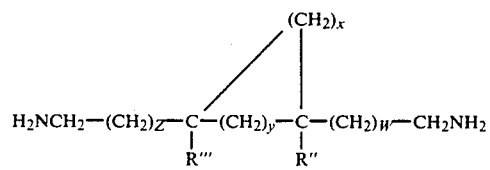

wherein:
R" and R"' represent hydrogen or lower alkyl;
Z is 0–5;
W is 0–4; and
X is 0–4, with the proviso that together X and Y equal 4.

Aliphatic diamines and triamines such as 1,4-butanediamine, and diethylenetriamine are preferably use in combination with sodium or zinc ionomers.

It is to be understood that the foregoing examples are given for the purpose of illustration and that any other suitable glass, ionomer resin, reinforcing plastic or the like could be used provided that the teachings of this disclosure are followed.

The basic building block of this invention, namely a laminate comprising a sheet of glass laminated to an ionomer resin film, may be used in multiples to achieve nearly any desired strength. This is illustrated in FIG. 9, wherein lamina of varying thickness of glass are sandwiched with lamina of varying thickness of ionomer resin film. By varying the number and the thickness of the lamina of glass and ionomer resin film, always, however, laminating in the alternative order shown in the Figure, it is possible to produce laminates having resistance to exceptionally large force. The principles of this invention may also be applied to curved laminated articles, such as windshields and face masks. The laminates shown in FIGS. 1–9 are flat merely for purposes of facilitating illustration. Where transparency is not critical, the bonding techniques taught herein may be used for laminating metal as well as glass such as illustrated in FIG. 8.

This invention may be embodied in other specific forms without departing from the spirit or essential attributes thereof, and accordingly, reference should be made to the appended claims, rather than to the foregoing specification, as indicating the scope of the invention.

Having thus described the invention,
What is claimed is:
1. A transparent laminated article comprising:
a first lamina consisting essentially of an ionomer resin film, said ionomer resin film being water insoluble and the metal salt of an ionomer resin prepared from ethylene and methacrylic acid monomers, said ionomer resin being partially neutralized by an organic diamine or triamine; and
one sheet of primed or unprimed glass laminated to said first ionomer.
2. A transparent laminated article as claimed in claim 1, further comprising a second sheet laminated to said first lamina on the surface thereof opposite said sheet of glass, whereby said first lamina is sandwiched between said sheet of glass and said second sheet, said second sheet being comprised of polycarbonate.

3. A transparent laminated article as claimed in claim 1, further comprising:
   a second sheet laminated to said first lamina on the surface thereof opposite said glass sheet;
   a second lamina laminated to said second sheet, said second sheet being comprised of polycarbonate and sandwiched between said first and second lamina;
   a second sheet of glass laminated to said second lamina on the surface thereof opposite said second sheet, whereby said second lamina is sandwiched between said second sheet and said second sheet of glass; and
   said second lamina consisting essentially of an extruded ionomer resin film, said ionomer resin film being water insoluble and selected from the group of ionomer resins which are ionically cross-linked copolymers prepared from ethylene and methacrylic acid monomers.

4. A transparent laminated article as claimed in claims 1, 2, or 3, wherein the surfaces laminated to said ionomer resin films are primed with a silane coupling agent.

5. A transparent lamina as claimed in claim 1, wherein said ionomer resin is a sodium salt of ethylene-methacrylic acid copolymer.

6. A transparent laminated article as claimed in claim 1, wherein said ionomer resin is a zinc salt of ethylene-methacrylic acid copolymer.

7. A transparent laminated article as claimed in claim 1, wherein said ionomer resin is a mixture of metal salts of ethylene-methacrylic acid copolymer.

8. A transparent laminated article as claimed in claim 1, wherein said first lamina has a thickness of 20 to 200 mils.

9. A method of forming a transparent laminated glass article comprising the steps of:
   providing a primed or unprimed glass sheet; and
   laminating a first lamina consisting essentially of an ionomer resin film to said glass sheet, said ionomer resin film being water insoluble and the metal salt of an ionomer resin prepared from ethylene and methacrylic acid monomers, said ionomer resin being partially neutralized by an organic diamine or triamine.

10. A method as claimed in claim 9, further comprising priming said glass surface adjacent said first lamina with a silane coupling agent before laminating said first lamina thereto.

11. A method as claimed in claim 10, wherein said laminating step comprises:
   heating said glass sheet and first lamina to a temperature in the range of approximately 180° F. to approximately 310° F.;
   maintaining the temperature for approximately 15 minutes to approximately one hour; and
   cooling as rapidly as possible without damaging the laminate.

12. A method as claimed in claim 11, wherein said heating occurs in an autoclave under a pressure of approximately 10 atmospheres.

13. A method as claimed in claim 9, further comprising the steps of covering the otherwise exposed surface of said first lamina with a hard coat material.

14. A method as claimed in claim 9, further comprising the step of laminating a second sheet to the otherwise exposed surface of said first lamina, said second sheet being selected from the group of materials consisting of polycarbonate, acrylic and metal.

15. A method as claimed in claim 14, wherein said second sheet is polycarbonate and further comprising the step of priming the surface of said polycarbonate to be bonded to said first lamina with a silane coupling agent.

16. A method as claimed in claim 15, further comprising the step of covering the otherwise exposed surface of said sheet of polycarbonate with a hard coat material.

17. A method as claimed in claim 9, further comprising the steps of:
   laminating a second sheet to the otherwise exposed surface of said first lamina, said second sheet being comprised of polycarbonate;
   laminating a second lamina to the otherwise exposed surface of said second sheet, said second lamina consisting essentially of an extruded ionomer resin film, said ionomer resin film being water insoluble and selected from the group of ionomer resins which are ionically cross-linked copolymers prepared from ethylene and methacrylic acid monomers; and
   laminating a second sheet of glass to the otherwise exposed surface of said second lamina.

18. A method as claimed in claim 17, further comprising the step of priming all surfaces to be bonded to said first and second laminas with a silane coupling agent.

19. A method as claimed in claim 9, wherein said first lamina has a thickness of 20 to 200 mils.

20. A transparent laminated article comprising:
   a first lamina having a thickness of at least 20 mils consisting essentially of an extruded ionomer resin film, said ionomer resin film being water insoluble and the metal salt of an ionomer resin prepared from ethylene and methacrylic acid monomers, said ionomer resins being partially neutralized by an organic diamine or triamine; and
   a sheet of primed or unprimed glass laminated to said first ionomer resin on one side and a sheet of plastic material on the other side.

21. A method of forming a transparent laminated glass article comprising the steps of:
   providing a primed or unprimed glass sheet; and
   laminating a first lamina consisting of an extruded ionomer resin film having a thickness of at least 20 mils to said glass sheet, said ionomer resin film being water insoluble and the metal salt of an ionomer resin resins which are ionically cross-linked copolymers prepared from ethylene and methacrylic acid monomers, said ionomer being partially neutralized by an organic diamine or triamine.

22. In a laminated product having at least one glass surface bonded with an opposing surface by an ionomer resin film, the improvement which comprises said ionomer resin film being a mixture of a zinc ionomer resin and a sodium ionomer resin, said ionomer being a copolymer prepared from ethylene or an alpa-olefin and carboxylic acid, and an organic polyamine partially neutralizing said resins for causing optical clarity of said ionomer resin.

23. The laminated product of claim 22, wherein said sodium and zinc ionomer resins are in a ratio of 95:5 to 5:95.

24. The laminate product of claim 22, wherein said organic polyamine is present in an amount of from about 0.5 to about 20% by weight of resin.

25. The laminate product of claim 22, wherein said opposing surface comprises a polycarbonate.

26. The laminated article of claim 1 wherein said organic diamine is selected from the group consisting of 1,3-diaminomethyl xylene, isophorone diamine and a monocyclic alicyclic compound of the formula:

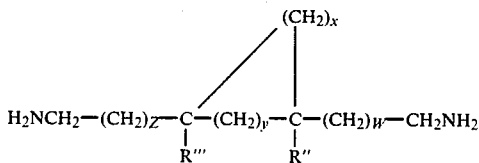

R'' and R''' represent hydrogen or lower alkyl;
Z is 0-5;
W is 0-4; and
X is 0-4, with the proviso that together X and Y equal 4.

27. The laminated article of claim 26 wherein said organic diamine is bis(1,3-aminomethyl)cyclohexane.

28. The laminated article of claim 26 wherein said metal is selected from the group consisting of alkali metals, aluminum and zinc.

29. The method of claim 9 wherein said organic diamine is selected from the group consisting of 1,3-diaminomethyl xylene, isophorone diamine and a monocyclic compound of the formula:

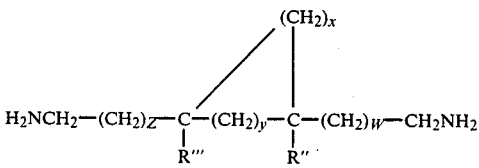

wherein:
R'' and R''' represent hydrogen or lower alkyl;
Z is 0-5;
W is 0-4; and
X is 0-4, with the proviso that together X and Y equal 4.

30. The method of claim 29 wherein said organic diamine is bis(1,3-aminomethyl)cyclohexane.

31. The method of claim 9 wherein said metal is selected from the group consisting of alkali metals, aluminum and zinc.

32. The laminated article of claim 20 wherein said organic diamine is selected from the group consisting of 1,3-diaminomethyl xylene, isophorone diamine and a monocyclic compound of the formula:

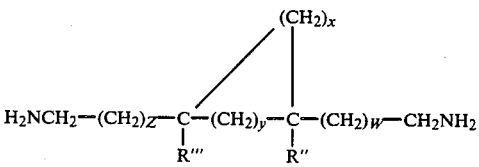

wherein:
R'' and R''' represent hydrogen or lower alkyl;
Z is 0-5;
W is 0-4; and
X is 0-4, with the proviso that together X and Y equal 4.

33. The laminated article of claim 32 wherein said diamine is bis(1,3-aminomethyl)cyclohexane.

34. The laminated article of claim 20 wherein said metal is selected from the group consisting of alkali metals, aluminum and zinc.

35. The laminated product of claim 22 wherein said organic diamine is selected from the group consisting of 1,3-diaminomethyl xylene, isophorone diamine and a monocyclic compound of the formula:

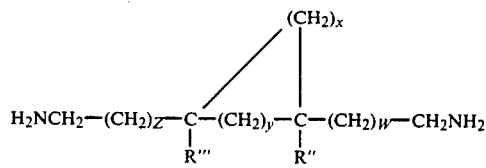

wherein:
R'' and R''' represent hydrogen or lower alkyl;
Z is 0-5;
W is 0-4; and
X is 0-4, with the proviso that together X and Y equal 4.

36. The laminated product of claim 35 wherein said diamine is bis(1,3-aminomethyl)cyclohexane.

37. A transparent laminated article comprising:
a first lamina consisting essentially of a Mylar film
a second lamina consisting essentially of an extruded ionomer resin film, said ionomer resin film being water insoluble and the metal salt of an ionomer resin prepared from ethylene and methacrylic acid monomers, said resin being partially neutralized by an organic polyamine, and
a sheet of transparent plastic material selected from the group consisting of polycarbonate, polyurethane and acrylic plastic.

38. The laminated product of claim 37 wherein said organic polyamine is selected from the group consisting of 1,3-diaminomethyl xylene, isophorone diamine and a monocyclic compound of the formula:

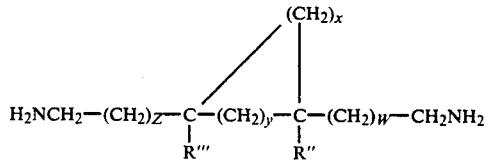

wherein:
R'' and R''' represent hydrogen or lower alkyl;
Z is 0-5;
W is 0-4; and
X is 0-4, with the proviso that together X and Y equal 4.

39. The laminated article of claim 38 wherein said polyamine is bis(1,3-aminomethyl)cyclohexane.

40. The laminated article of claim 38, wherein said metal is selected from the group consisting of sodium, zinc and mixtures thereof.

* * * * *